(12) United States Patent
Christie et al.

(10) Patent No.: US 8,580,460 B2
(45) Date of Patent: Nov. 12, 2013

(54) APPARATUS AND METHOD FOR MANAGING FLUIDS IN A FUEL CELL STACK

(75) Inventors: Andrew L. Christie, Vancouver (CA); Simon Farrington, Vancouver (CA); Herwig R. Haas, Vancouver (CA); Christopher J. Richards, New Westminster (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 975 days.

(21) Appl. No.: 12/514,979

(22) PCT Filed: Nov. 13, 2007

(86) PCT No.: PCT/US2007/084563
§ 371 (c)(1), (2), (4) Date: Nov. 12, 2009

(87) PCT Pub. No.: WO2008/061094
PCT Pub. Date: May 22, 2008

(65) Prior Publication Data
US 2010/0062289 A1 Mar. 11, 2010

Related U.S. Application Data

(60) Provisional application No. 60/865,708, filed on Nov. 14, 2006.

(51) Int. Cl.
*H01M 8/04* (2006.01)

(52) U.S. Cl.
USPC .......................................................... 429/514

(58) Field of Classification Search
None
See application file for complete search history.

(56) References Cited

U.S. PATENT DOCUMENTS

| | | | |
|---|---|---|---|
| 2003/0041444 A1* | 3/2003 | Debe et al. .................... | 29/623.1 |
| 2005/0214626 A1* | 9/2005 | Ohma .............................. | 429/38 |
| 2005/0260482 A1 | 11/2005 | Frank et al. | |
| 2006/0210855 A1* | 9/2006 | Frank et al. ..................... | 429/26 |

OTHER PUBLICATIONS

International Search Report and Written Opinion of the International Searching Authority, dated Apr. 2, 2008 (11 pages).

* cited by examiner

*Primary Examiner* — Patrick Ryan
*Assistant Examiner* — Muhammad Siddiquee
(74) *Attorney, Agent, or Firm* — Patent Central LLC; Stephan A. Pendorf

(57) ABSTRACT

A plurality of flow field plate assemblies forms a fuel cell stack. Each flow field plate assembly has a first flow field plate positionable on an anode side of a membrane electrode assembly (MEA) of a first fuel cell, a second flow field plate positionable on a cathode side of an MEA of a second fuel cell, adjacent the first fuel cell. At least one back-feed channel is interposed between the first and second flow field plates. At least a portion of the back-feed channel or a reactant manifold opening formed by the first and second flow field plates has a geometry that forms regions of high and low capillary forces, promoting liquid migration toward regions substantially isolated from a flow of reactants, to prevent water collection and ice formation. The migrated liquid is purged during a purge of the fuel cell stack after operation.

14 Claims, 15 Drawing Sheets

APPARATUS AND METHOD FOR MANAGING FLUIDS IN A FUEL CELL STACK

BACKGROUND OF THE INVENTION

1. Field of the Invention

The present invention generally relates to electrochemical systems, and more particularly, to an apparatus and method for managing fluids in a fuel cell stack.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically promotes the desired electrochemical reactions at the electrodes. The location of the electrocatalyst generally defines the electrochemically active area.

One type of electrochemical fuel cell is a proton exchange membrane (PEM) fuel cell 10 shown in FIG. 2. PEM fuel cells 10 generally employ a membrane electrode assembly (MEA) 5 comprising a solid polymer electrolyte or ion-exchange membrane 2 disposed between two electrodes 1, 3, as shown in FIG. 1. Each electrode 1, 3 typically comprises a porous, electrically conductive substrate, such as carbon fiber paper or carbon cloth, which provides structural support to the membrane 2 and serves as a fluid diffusion layer. The membrane 2 is ion conductive, typically proton conductive, and acts both as a barrier for isolating the reactant streams from each other and as an electrical insulator between the two electrodes 1, 3. A typical commercial PEM 2 is a sulfonated perfluorocarbon membrane sold by E.I. Du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

As shown in FIG. 2, in a fuel cell 10, the MEA 5 is typically interposed between two separator plates 11, 12 that are substantially impermeable to the reactant fluid streams. Such plates 11, 12 are referred to hereinafter as flow field plates 11, 12. The flow field plates 11, 12 provide support for the MEA 5. Fuel cells 10 are typically advantageously stacked to form a fuel cell stack 50 having end plates 17, 18, which retain the stack 50 in the assembled state as illustrated in FIG. 3.

FIG. 4 illustrates a conventional electrochemical fuel cell system 60, as more specifically described in U.S. Pat. Nos. 6,066,409 and 6,232,008. As shown, the fuel cell system 60 includes a pair of end plate assemblies 62, 64, and a plurality of stacked fuel cells 66, each comprising an MEA 68, and a pair of flow field plates 70a, 70b (generally referred to as flow field plates 70). Between each adjacent pair of MEAs 68 in the system 60, there are two flow field plates 70a, 70b which have adjoining surfaces. A pair of abutting flow field plates 70a, 70b can instead be fabricated from a unitary plate forming a bipolar plate. A tension member 72 extends between the end plate assemblies 62, 64 to retain and secure the system 60 in its assembled state. A spring 74 with clamping members 75 can grip an end of the tension member 72 to apply a compressive force to the fuel cells 66 of the system 60.

Fluid reactant streams are supplied to and exhausted from internal manifolds and passages in the system 60 via inlet and outlet ports 76 in the end plate assemblies 62, 64. Aligned internal reactant manifold openings 78, 80 in the MEAs 68 and flow field plates 70, respectively, form internal reactant manifolds extending through the system 60. As one of ordinary skill in the art will appreciate, in other representative electrochemical fuel cell stacks, reactant manifold openings may instead be positioned to form edge or external reactant manifolds.

A perimeter seal 82 can be provided around an outer edge of both sides of the MEA 68. Furthermore manifold seals 84 can circumscribe the internal reactant manifold openings 78 on both sides of the MEA 68. When the system 60 is secured in its assembled, compressed state, the seals 82, 84 cooperate with the adjacent pair of flow field plates 70 to fluidly isolate fuel and oxidant reactant streams in internal reactant manifolds and passages, thereby isolating one reactant stream from the other and preventing the streams from leaking from the system 60.

As illustrated in FIG. 4, each MEA 68 is positioned between the active surfaces of the flow field plates 70. Each flow field plate 70 has flow field channels 86 (partially shown) on the active surface thereof, which contacts the MEA 68 for distributing fuel or oxidant fluid streams to the active area of the contacted electrode of the MEA 68. The reactant flow field channels 86 on the active surface of the flow field plates 70 fluidly communicate with the internal reactant manifold openings 80 via reactant supply/exhaust passageways comprising back-feed channels 90 located on the non-active surface of the plate 70 and back-feed ports 92, extending through (i.e., penetrating the thickness) the plate 70, and transition regions 94 located on the active surface of the plate 70. As shown, with respect to one port 92, one end of the port 92 can open to the adjacent back-feed channels 90, which can in turn be open to the internal reactant manifold opening 80, and the other end of the port 92 can be open to the transition region 94, which can in turn be open to the reactant flow field channels 86.

Instead of two plates 70a, 70b, one plate 70 unitarily formed or alternatively fabricated from two half plates 70a, 70b can be positioned between the cells 66, forming bipolar plates as discussed above.

The flow field plates 70 also have a plurality of typically parallel flow field channels 96 formed in the non-active surface thereof. The channels 96 on adjoining pairs of plates 70 cooperate to form coolant flow fields 98 extending laterally between the opposing non-active surfaces of the adjacent fuel cells 66 of the system 60 (i.e., generally perpendicular to the stacking direction). A coolant stream, such as air or other cooling media may flow through these flow fields 98 to remove heat generated by exothermic electrochemical reactions, which are induced inside the fuel cell system 60.

In the conventional fuel cell system 60, water typically accumulates in the flow field channels 86, back-feed channels 90 and/or back-feed ports 92. As gas, such as reactants and/or oxidants, is injected into the flow field channels 86, the gas pressure and movement may flush some of the accumulated water through the above-described outlets.

If a relatively large amount of water collects in a localized region of the flow field channels 86, back-feed channels 90 and/or back-feed port 92, the water may block the channels 86, 90 or port 92. If the accumulated water blocks the channels 86, 90 or port 92, gas flow can be adversely affected, and in extreme cases, cease. Consequently, as the reactants and/or oxidants in the gas residing in the blocked channels 86, 90 or port 92 are depleted, electrical output and fuel efficiency of the fuel cell decreases.

Such water accumulation can also lead to ice formation before and during freeze startups. Although purging the water from the system is one option for preventing water accumulation, regions of low purge velocity tend to retain water during a purge. Furthermore, due to the large ratio of capillary forces from the back-feed port 92 to the reactant manifold openings 78, water tends to wick back into the exit of the back-feed port 92 after the purge. Therefore, after the purge, regions of low purge velocity in the reactant manifold openings 78 typically store relatively large amounts of water, which may wick or otherwise move back into the back-feed channels 90 and/or back-feed port 92. This water can freeze, resulting in ice blockage. These blockages typically prevent efficient reactant access and flow to the flow field channels 86 and may cause uneven flow sharing and/or fuel starvation in the fuel cell system 60.

In addition to purging the water from the system 60, other methods of mitigating ice blockages include operating the fuel cell system 60 extremely dry; however, even then, some water accumulation and/or ice blockage occurs because it is nearly impossible to completely prevent water from exiting the fuel cells 66. Furthermore, operating fuel cell systems in extremely dry conditions typically impedes performance and reduces the fatigue life of the system 60.

Those of ordinary skill in the art will appreciate that other configurations for the reactant supply manifolds and back-feed channels and ports exist, nearly all of which suffer from the above obstacles. For example, FIG. 5 illustrates a front view of a non-active side of a flow field plate 100 of another conventional system. Reactant back-feed channels 102 and ports 104 are prone to water formation and ice blockage as described above. FIG. 5 more clearly conveys the adverse effect of ice blockage in these channels 102 and ports 104 on the operation of the fuel cell system because if these channels 102 and ports 104 are blocked or even partially obstructed, reactants such as fuel and oxidants cannot efficiently reach the active side of the flow field plate 100 to support reactions necessary for the system to operate efficiently.

Accordingly, there is a need for an apparatus and method for managing fluid flow in a fuel cell stack that substantially prevents water retention and ice-blockage formation in the fuel cell stack, that is inexpensive, space conserving and easy to implement.

BRIEF SUMMARY OF THE INVENTION

According to one embodiment, a flow field plate assembly for use in a fuel cell stack having a plurality of fuel cells, each comprising a membrane electrode assembly (MEA), comprises a first flow field plate having first and second reactant manifold openings and being positionable on an anode side of the MEA of a first fuel cell, a first side of the first flow field plate having at least one reactant flow field channel adapted to direct a fuel to an anode electrode layer of the MEA, and a second flow field plate having third and fourth reactant manifold openings and being positionable on a cathode side of the MEA of a second fuel cell, adjacent the first fuel cell, a first side of the second flow field plate having at least one reactant flow field channel adapted to direct an oxygen-containing gas to a cathode electrode layer of the MEA, the third reactant manifold opening being positioned adjacent the first reactant manifold opening to form a fuel manifold opening and the fourth reactant manifold opening being positioned adjacent the second reactant manifold opening to form an oxidant manifold opening, a periphery of at least one of the fuel and oxidant manifold openings having a cross-sectional geometry that forms regions of high and low capillary forces configured to direct liquid migration toward regions substantially isolated from a flow of reactants, when the flow field plate is installed in the fuel cell stack and the fuel cell stack is in operation.

According to another embodiment, a fuel cell stack comprises a plurality of fuel cells, each fuel cell having a membrane electrode assembly (MEA) having an ion-exchange membrane interposed between anode and cathode electrode layers, each MEA being interposed between first and second flow field plates, the first flow field plate of each fuel cell between end fuel cells being positioned adjacent the second flow field plate of an adjacent fuel cell, the first flow field plate having first and second reactant manifold openings, a first side of the first flow field plate having at least one reactant flow field channel adapted to direct a fuel to the anode electrode layer of the corresponding MEA, the second flow field plate having third and fourth reactant manifold openings, a first side of the second flow field plate having at least one reactant flow field channel adapted to direct an oxygen-containing gas to the cathode electrode layer of the corresponding MEA, the first reactant manifold opening of the first flow field plate of the fuel cells positioned between the end fuel cells being positioned adjacent the third reactant manifold opening of the adjacent second flow field plate of the adjacent fuel cell, forming a fuel manifold opening, the second reactant manifold opening of each fuel cell positioned between the end fuel cells being positioned adjacent the fourth reactant manifold opening of the adjacent second flow field plate of the adjacent fuel cell, forming an oxidant manifold opening, a periphery of at least one of the fuel and oxidant manifold openings having a cross-sectional geometry that forms regions of high and low capillary forces configured to direct liquid migration toward regions substantially isolated from a flow of reactants, when the fuel cell stack is in operation.

According to yet another embodiment, a method of repelling liquids from at least a first region of a fuel cell stack, through which at least one of reactants and coolants flow when the fuel cell stack is in operation, the fuel cell stack having a plurality of fuel cells, each fuel cell including a membrane electrode assembly (MEA), a first flow field plate positioned on an anode side of the MEA and having first and second reactant manifold openings, at least a portion of a first side of the first flow field plate having at least one reactant flow field channel adapted to direct a fuel to at least a portion of an anode electrode layer of the MEA, a second flow field plate positioned on a cathode side of the MEA and having third and fourth reactant manifold openings, at least a portion of a first side of the second flow field plate having at least one reactant flow field channel adapted to direct an oxygen-containing gas to at least a portion of a cathode electrode layer of the MEA, the first flow field plate of each fuel cell between end fuel cells being positioned adjacent the second flow field plate of an adjacent fuel cell, the first reactant manifold opening of the first flow field plate being positioned adjacent the third reactant manifold opening of the adjacent second flow field plate, forming a fuel manifold opening, and the second reactant manifold opening of the first flow field plate being positioned adjacent the fourth reactant manifold opening of the adjacent second flow field plate, forming an oxidant manifold opening, and at least one back-feed channel between the adjacent first and second flow field plates in fluid communication with at least one of the fuel and oxidant manifold openings and at least one of the reactant flow field channels, comprises forming regions shaped to create high and low capillary forces to promote liquid migration toward regions substantially isolated from the first region in the fuel cell stack, when the fuel cell stack is in operation.

BRIEF DESCRIPTION OF THE SEVERAL VIEWS OF THE DRAWING(S)

DETAILED DESCRIPTION OF THE INVENTION

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 6:
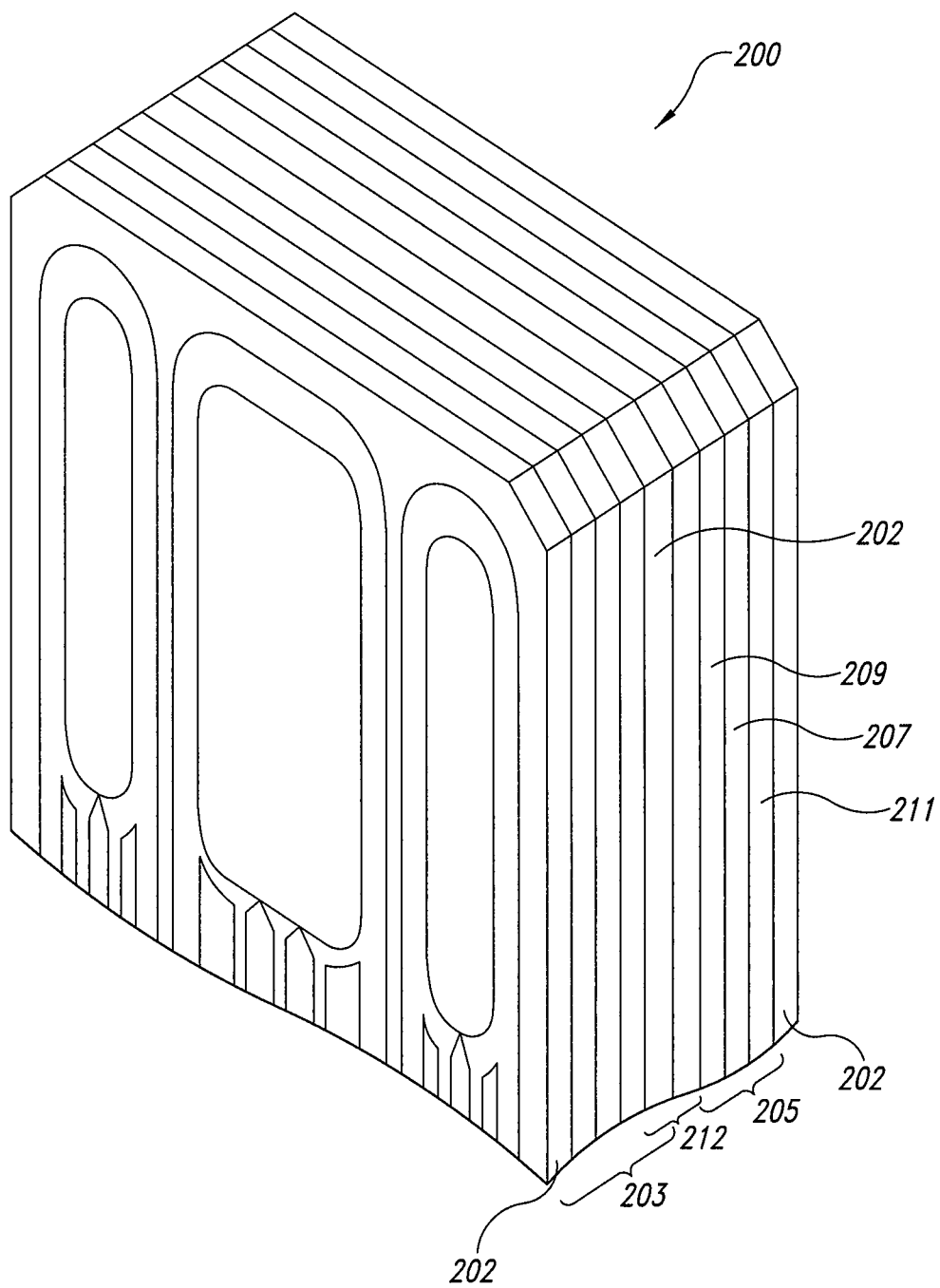
FIG. 6 is an isometric view of a portion of a fuel cell stack according to an embodiment of the present invention.

FIG. 6 illustrates a portion of a fuel cell stack 200 according to one embodiment of the present invention, in which the fuel cell stack 200 comprises fuel cells 203, each fuel cell 203 including a membrane electrode assembly 205 interposed between two flow field plates 202. Each membrane electrode assembly 205 comprises a proton exchange membrane 207 interposed between two electrode layers, for example an anode electrode layer 209 and a cathode electrode layer 211.

Figure 7A:
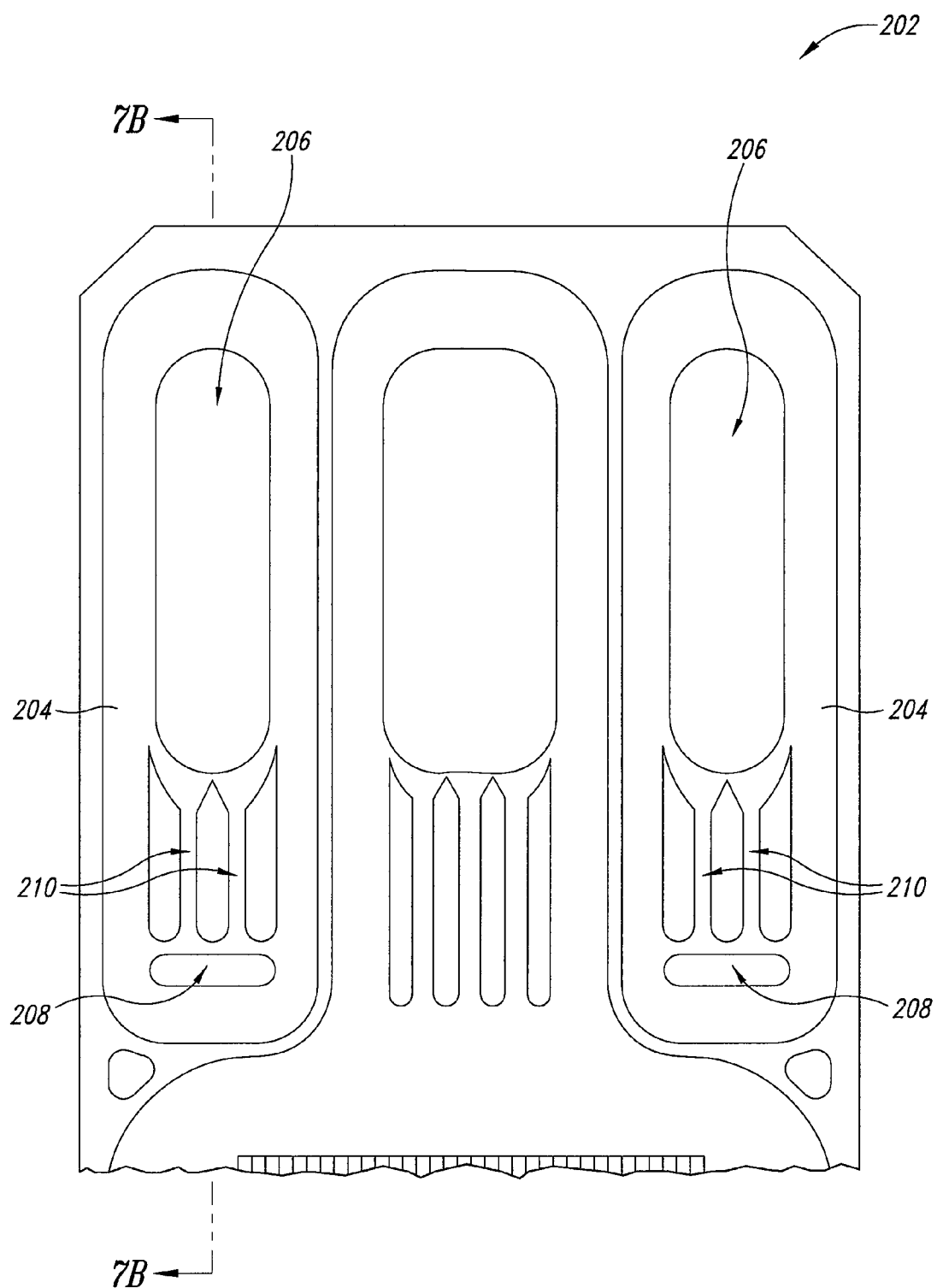
FIG. 7A is a front view of a portion of a flow field plate according to an embodiment of the present invention.
Figure 7B:
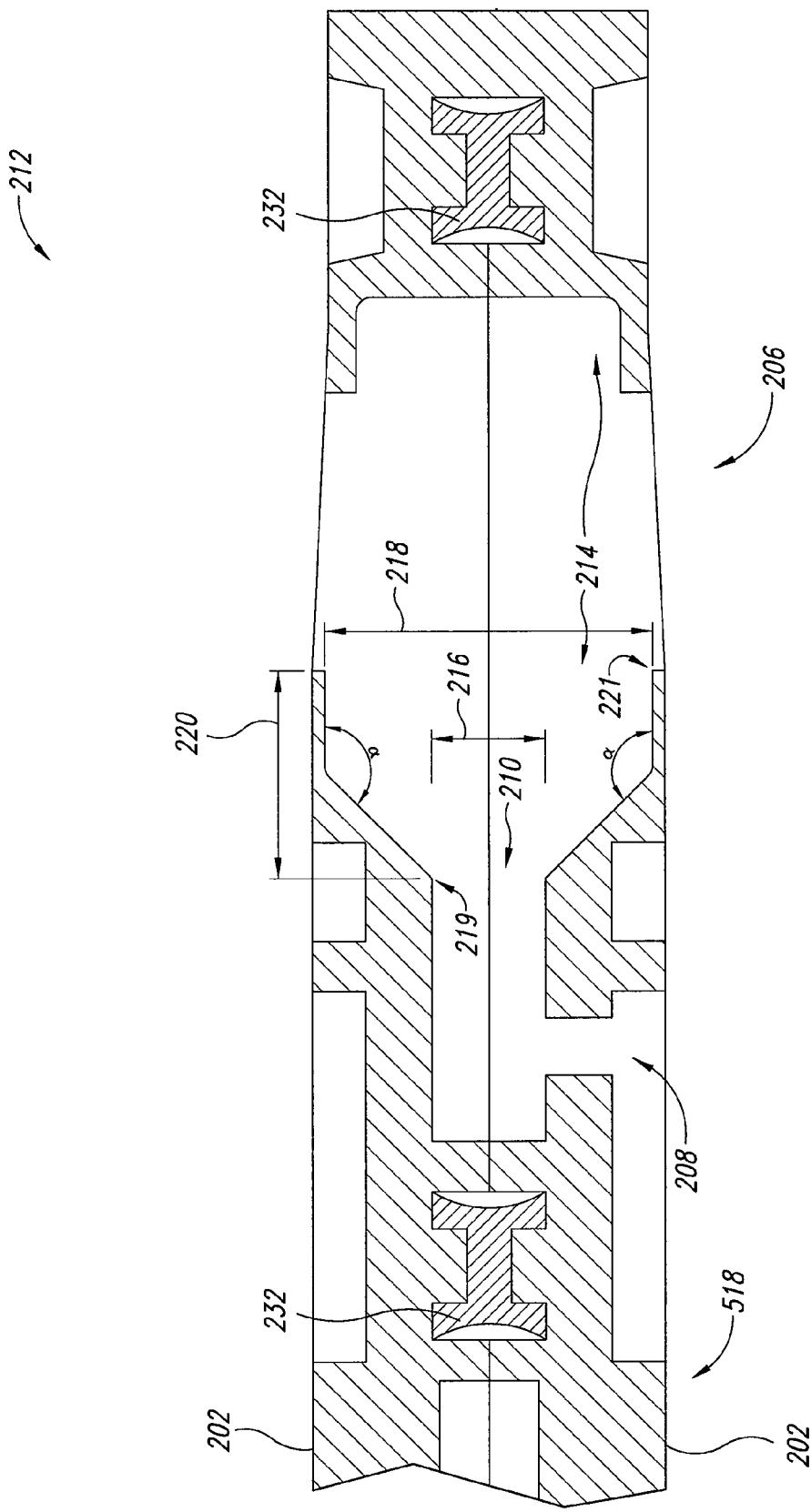
FIG. 7B is a cross-sectional view of the portion of the flow field plate of FIG. 7A1 viewed across section 7B-7B.

FIG. 7A illustrates an inactive side 204 of one of the flow field plates 202. The illustrated flow field plate 202 comprises reactant manifold openings 206, each in fluid communication with a back-feed port 208 via a plurality of back-feed channels 210. Most of the fuel cells 203 (FIG. 6) of the fuel cell stack 200 (FIG. 6), for example all but the end fuel cells, comprise two flow field plates 202, a first flow field plate 202 positioned on an anode side of the fuel cell 203 and a second flow field plate 202 positioned on a cathode side of the fuel cell 203. The first flow field plate 202 of the fuel cells 203, can be bonded to the second flow field plate 202 of the adjacent fuel cell 203, by any suitable bonding means forming a flow field plate assembly 212 (FIG. 6). In FIG. 7A, one of the flow field plates 202 is not shown for clarity of illustration. FIG. 7B illustrates a cross-sectional view of a portion of the flow field plate assembly 212 proximate one of the reactant manifold openings 206.

Figure 1:
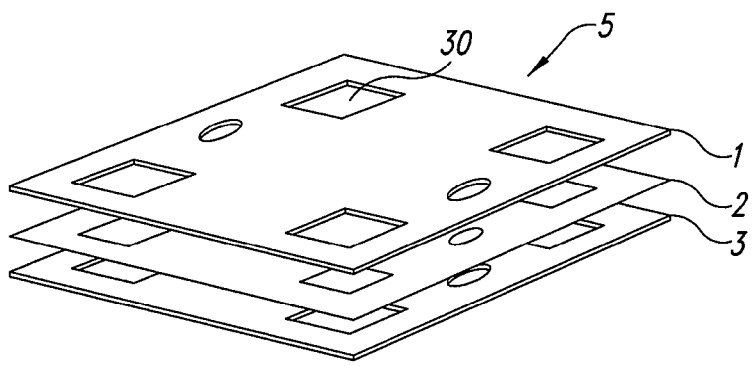
FIG. 1 is an exploded isometric view of a membrane electrode assembly according to the prior art.
Figure 2:
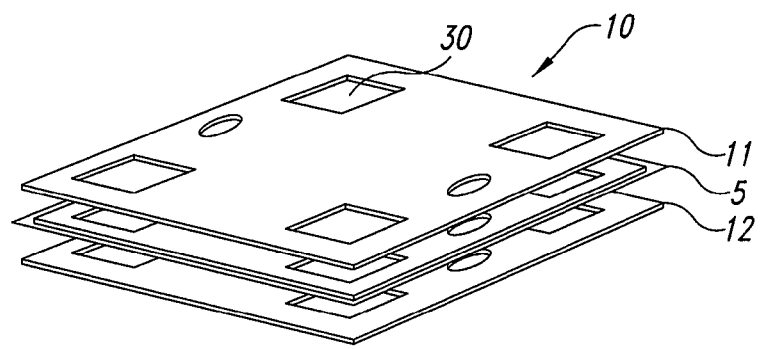
FIG. 2 is an exploded isometric view of a fuel cell according to the prior art.
Figure 3:
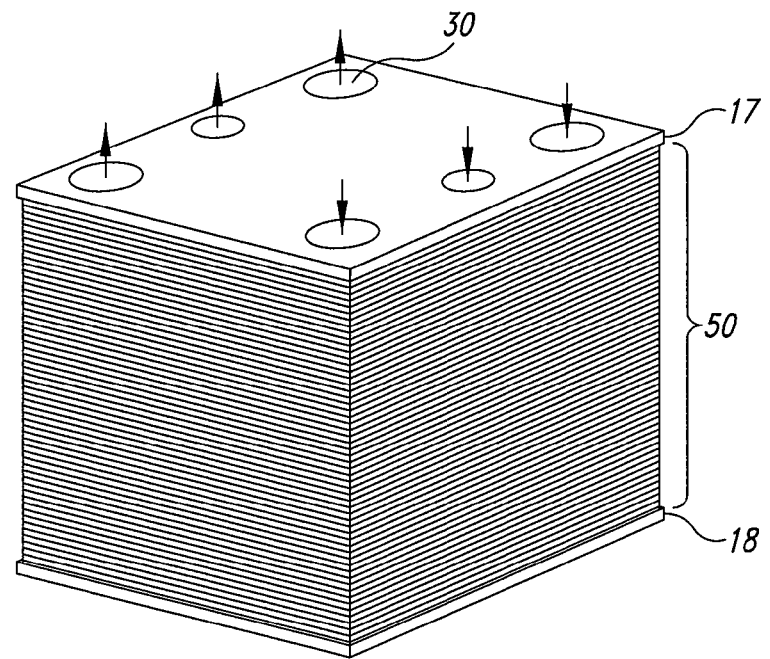
FIG. 3 is an isometric view of a fuel cell stack according to the prior art.
Figure 4:
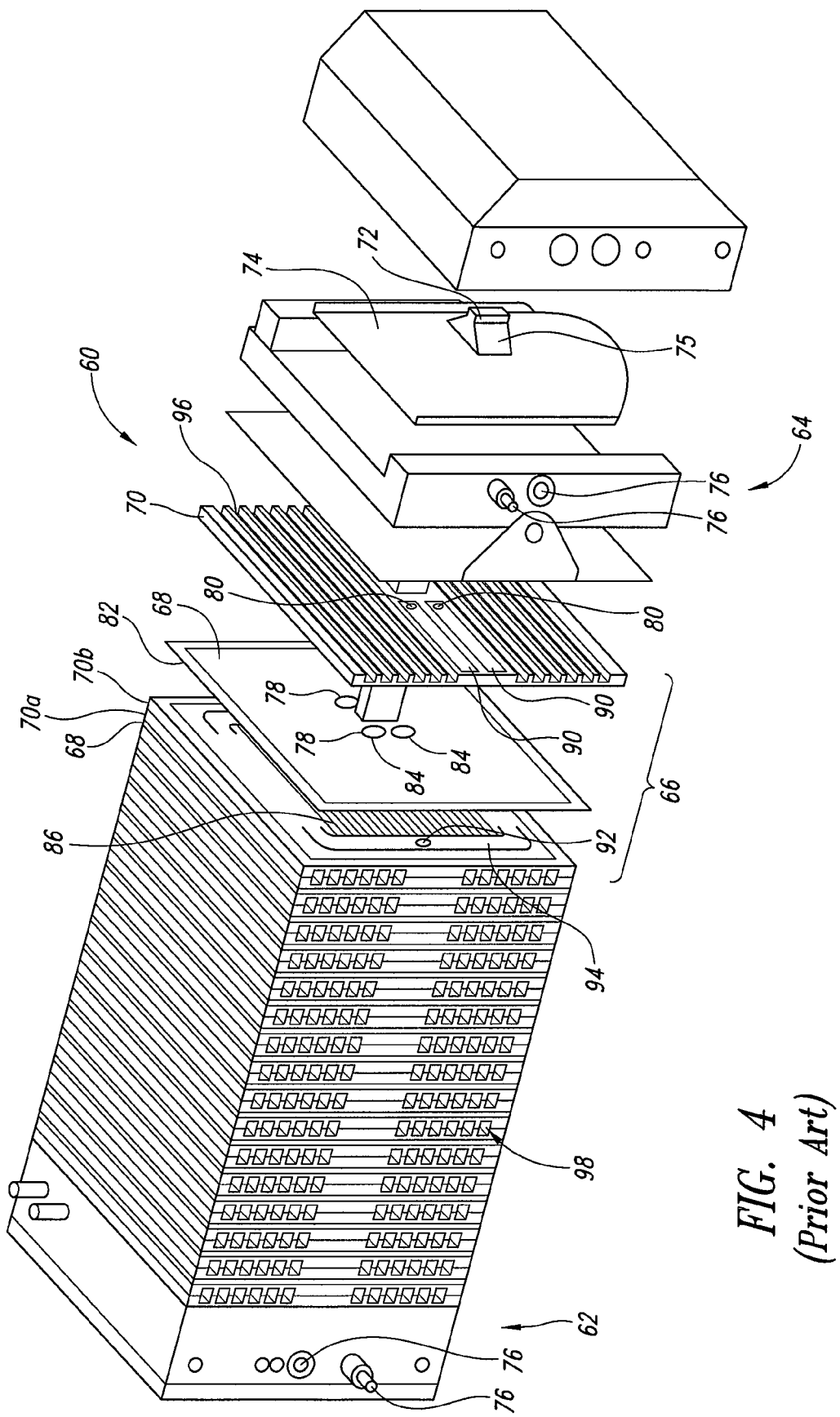
FIG. 4 is a partially exploded isometric view of a fuel cell system according to the prior art.
Figure 5:
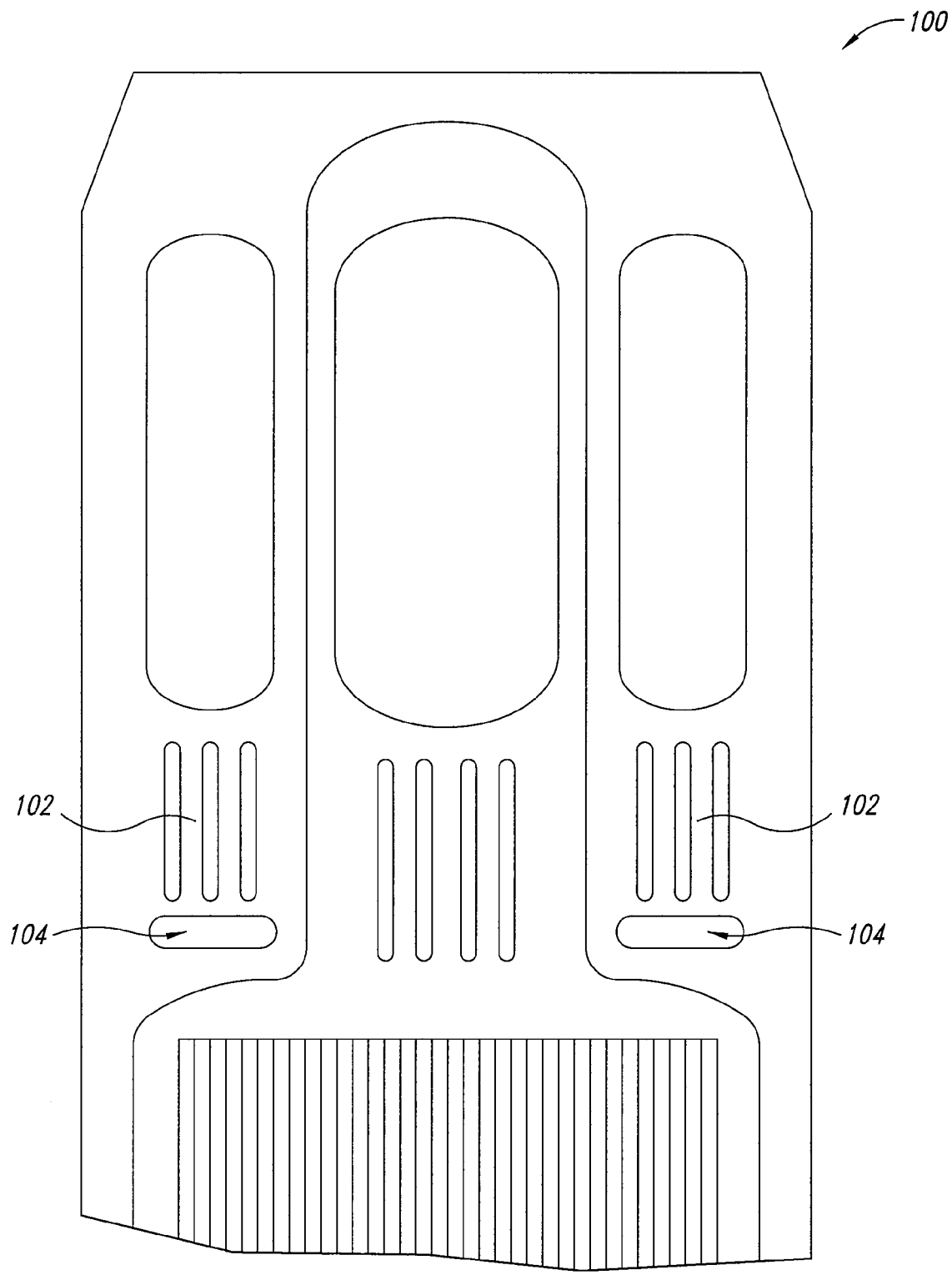
FIG. 5 is a front view of a portion of a flow field plate according to the prior art.

Typically, in conventional fuel cell stacks, such as the fuel cell stack of the fuel cell system 60, illustrated in FIG. 4, regions of low purge velocity and high capillary force, such as a region between reactant manifold openings 78 and back-feed channels 90, tend to retain water, even during a purge of the fuel cell stack. Furthermore, water typically tends to wick back into the back-feed channels 90 after the purge. The collected water may freeze and form ice blockages in regions proximate to the manifold openings 78 and also in the back-feed channels 90 or back-feed ports 92.

FIG. 7B illustrates the flow field plate assembly 212 including two flow field plates 202 bonded together at bond joints 232. In an embodiment of the present invention, the plate assembly 212 of at least some of the fuel cells 203 (FIG. 6) of the fuel cell stack 200 (FIG. 6) may comprise back-feed channels 210 and a reactant manifold opening 206 delivering reactants to the back-feed channels 210. The two flow field plates 202 form a slot 214 comprising a narrow end 219 having a narrow dimension 216 and a wide end 221 having a wide dimension 218. The wide dimension 218 will hereinafter be referred to as slot height 218. The slot 214 may extend at least partially, or completely, around a periphery of the reactant manifold opening 206. An angle a determines a geometry of a transition portion of the slot 214 between the wide end 221 and the narrow end 219. For example, the angle a can be obtuse or greater than 90 degrees, or it can be a right angle or substantially 90 degrees. When a is an obtuse angle, the transition region can for example include a cross-sectional geometry including a portion in which the flow field plates 202 are parallel and a portion in which the flow field plates 202 are tapered, as shown in FIG. 7B with respect to the slot 214 adjacent the back-feed channel 210. Alternatively, when the angle a is a substantially right angle, the transition region of the slot 214 can for example include a substantially rectangular cross-section, as shown in FIG. 7B with respect to the slot 214 opposing the back-feed channel 210.

In some embodiments, a portion or portions of the slot 214 adjacent the back-feed channels 210 may converge toward and be in fluid communication with the back-feed channels 210. In some embodiments the narrow dimension 216 of the narrow end 219 can be substantially equivalent to a dimension of an end of the back-feed channel 210 toward the reactant manifold opening 206.

The slot height 218 can be predetermined to be large enough to prevent a liquid, such as water, from wicking along a portion of the flow field plates 202, which may otherwise interfere with the flow of reactants, such as between the reactant manifold openings 206 and the back-feed channels 210. As one example, with respect to the back-feed channels 210, the wicking height of water typically depends on a size of a perimeter of the back-feed channels 210 and a contact angle of a material of the flow field plates 202. Accordingly, the slot height 218 depends on the wicking height of water and can vary among flow field plates 202 having different geometries. For example, the slot height 218 of slot the 214 can be approximately 0.8 mm (0.031 inches) when the wicking height is between 10 mm (0.394 inches) and 12 mm (0.472 inches) and the contact angle is 50 degrees. Since a space between the flow field plates 202 is wider at the periphery of the reactant manifold opening 206, water droplets that can adhere to each plate at the wide end 221 of the slot 214, do not wick toward the back-feed channels 210. Instead, due to gravity and reduced capillary force, the water tends to move or drop toward at least a portion of the reactant manifold opening 206, from which the accumulated water can be flushed out of the fuel cell stack with fluids, such as fuel and/or oxidant exhaust when the fuel cell stack 200 is in operation or with water and/or reactants during a purge of the fuel cell stack 200 after operation.

In some embodiments a longitudinal cross section of the flow field plate assembly 212 is oriented such that the reduced capillary forces and a force of gravity promote liquid migration to a bottom portion of the at least one of the fuel and oxidant manifold openings 206. For example, FIG. 7B illustrates a longitudinal cross-section of the flow field plate assembly 212, and in some applications, a direction of the force of gravity can be substantially perpendicular to the longitudinal cross-section. Therefore, water tends to accumulate toward a lower portion or a bottom portion of the reactant manifold opening 206 due to both the reduced capillary force and the force of gravity. In some embodiments, the bottom portion may include a portion of the manifold opening 206 toward which the force of gravity is directed. Simultaneously, or subsequently, the accumulated water can be flushed out from the bottom portion of the reactant manifold opening 206 of the fuel cell stack with fluids, in a similar manner as discussed above.

The narrow dimension 216 of the narrow end 219 is smaller than the wide dimension 218 of the wide end 221. For example, in the example above, where the wide dimension 218 of the wide end is 0.8 mm (0.031 inches), the narrow dimension 216 of the narrow end 219 can be approximately 0.4 mm (0.016 inches). A dimension 220 of a shortest length of the slot 214, extending between the narrow end 219 and the wide end 221, can also be predetermined to promote wicking back of the liquid to the slot 214. For example, in one embodiment, the dimension 220 of the length can be approximately 2 mm (0.008 inches).

Figure 8A:
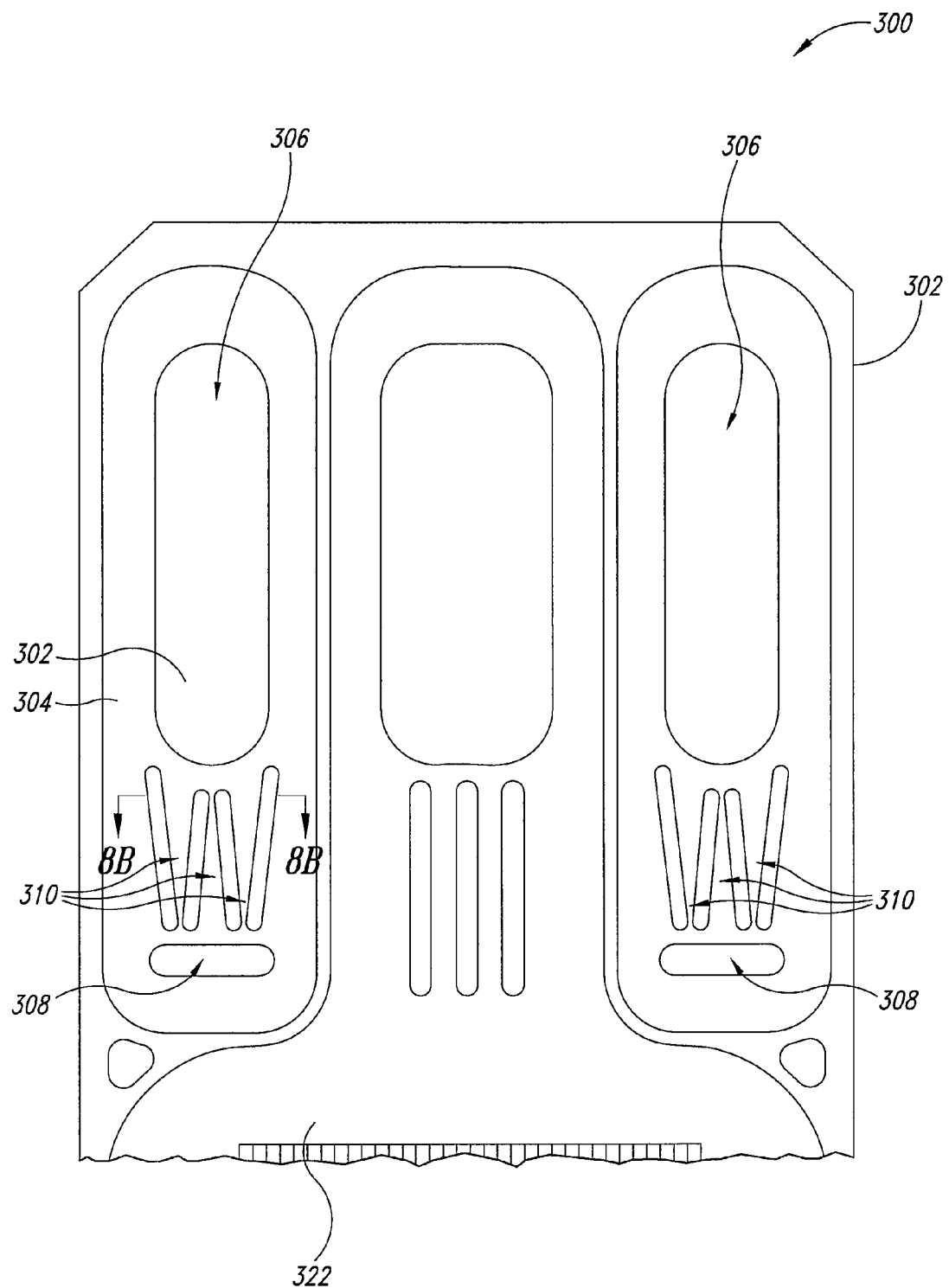
FIG. 8A is a front view of a portion of a flow field plate according to another embodiment of the present invention.
Figure 8B:
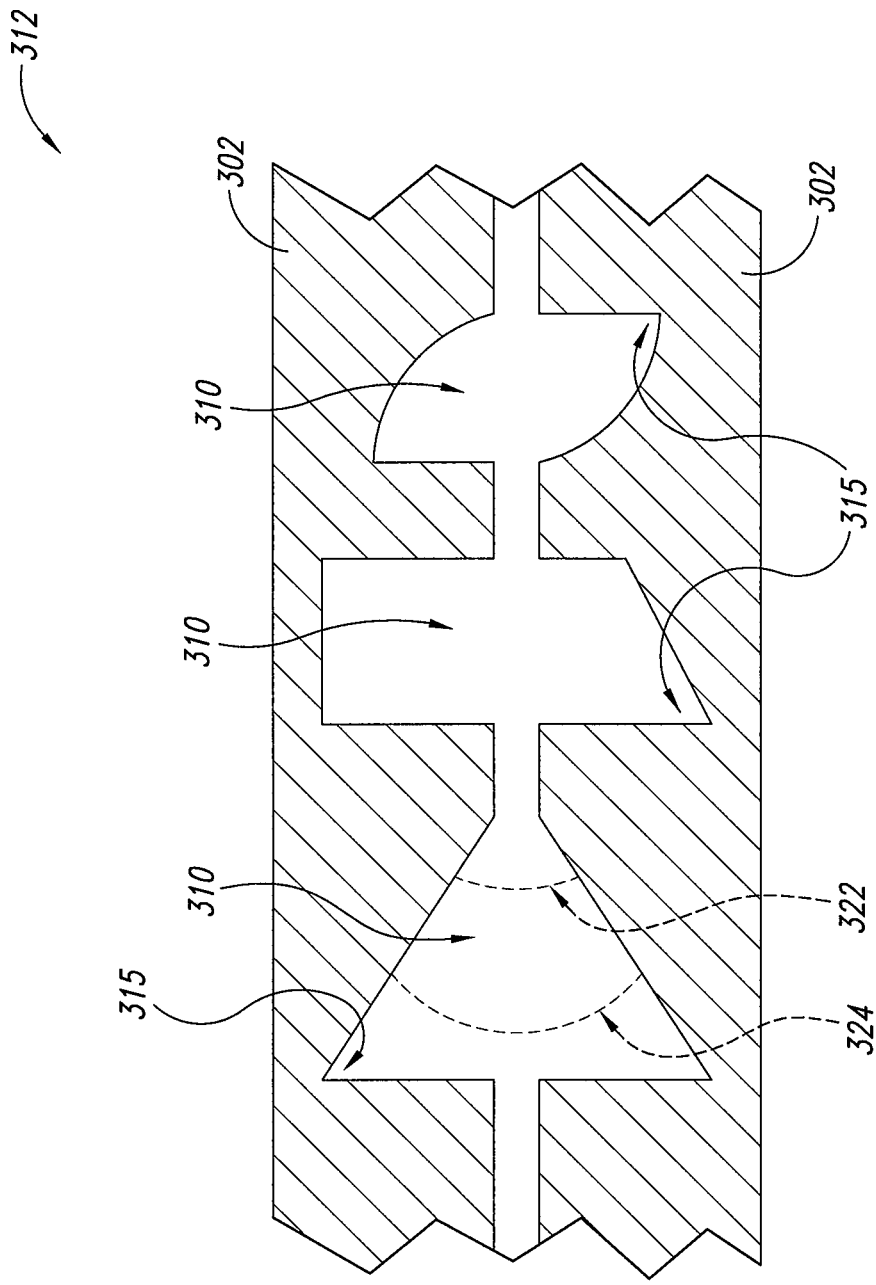
FIG. 8B is a cross-sectional view of a portion of the flow field plate of FIG. 8A, viewed across section 8B-8B.

FIG. 8A illustrates a portion of a fuel cell stack 300 according to another embodiment of the present invention, in which the fuel cell stack 300 comprises a plurality of fuel cells, each having a membrane electrode assembly interposed between two flow field plates 302. FIG. 8A illustrates an inactive side 304 of one of the flow field plates 302. As illustrated in FIG. 8A, the flow field plate 302 may comprise back-feed channels 310 that may taper along a length of a surface of the back-feed channels 310, the taper extending in a direction of reactant flow from the reactant manifold opening 306 to the back-feed port 308 to promote exhausting accumulated water from the fuel cell stack 300 during a purge of the fuel cell stack 300. In FIG. 8A, one of the flow field plates 302 is not shown for clarity of illustration. FIG. 8B is a cross-sectional view of a portion of the flow field plate assembly 312 across the back-feed channels 310, illustrating both flow field plates 302.

As illustrated in FIG. 8B, in some embodiments, the back-feed channels 310 may comprise a cross-sectional shape that promotes liquid migration, for example water migration, toward regions that substantially do not interfere with a flow of reactants when the fuel cell stack 300 is in operation. By designing back-feed channel 310 cross-sections that comprise a high capillary force region 322 and a low capillary force region 324, liquids such as water may advantageously be forced in desired locations, such as for example proximate a corner 315 of the back-feed channel 310 cross-sections. Accordingly, liquids, such as water, may advantageously be collected in regions that do not interfere with the flow of reactants. Subsequently, the collected water may be exhausted from the fuel cell stack 300 during the purge of the fuel cell stack 300, or if desired, recycled back into the fuel cell stack 300 to serve a purpose, such as cooling the fuel cell stack 300. Even when a temperature equivalent or below a freezing temperature of the liquid is encountered, since the liquid is not in the reactant flow path, ice formation should not block or significantly impede the flow of reactants.

For example, the cross-sectional shape of the back-feed channels 310 may comprise a triangular wedge shape, a parallelogram, a circular shape, an elliptical shape, an irregular shape having linear and/or curvilinear portions, any combination thereof, or any other shape that promotes forcing liquids to the region 315 that substantially does not interfere with the flow of reactants.

Although the cross-sectional shape of the back-feed channels 310 can comprise constant dimensions, as described above, these shapes can also taper, providing regions of high and low capillary force along two axes; one that extends substantially laterally with respect to the back-feed channels 310 and one that extends substantially longitudinally with respect to the back-feed channels 310 (i.e. substantially parallel to the reactant flow direction). One of ordinary skill in the art having reviewed this disclosure will appreciate these and other modifications that can be made to the geometry of the back-feed channels 310 to selectively force liquids such as water in a desired direction toward a desired location that does not interfere with the flow of the reactants, without departing from the scope of the present invention. For example, the cross-sectional shape of the back-feed channels 310 may rotate along a length of the back feed channels 310 about an axis substantially perpendicular to the cross-section of the back feed channels 310.

Additionally, it is understood, that respective back-feed channels 310 may comprise a same or different cross-sectional shapes and longitudinal taper and/or rotation features. Furthermore, the back-feed channels 310 may comprise the channel geometries along their lengths as discussed in conjunction with FIGS. 8A and 8B in addition to the slot 214 as discussed in conjunction with FIGS. 7A and 7B.

Figure 9A:
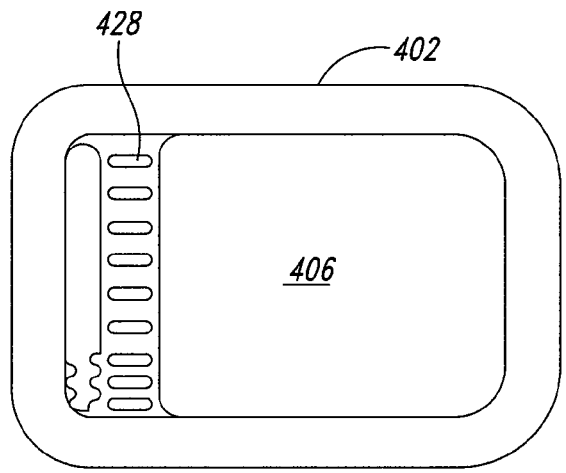
FIG. 9A is a front view of a flow field plate according to yet another embodiment of the present invention.
Figure 9B:
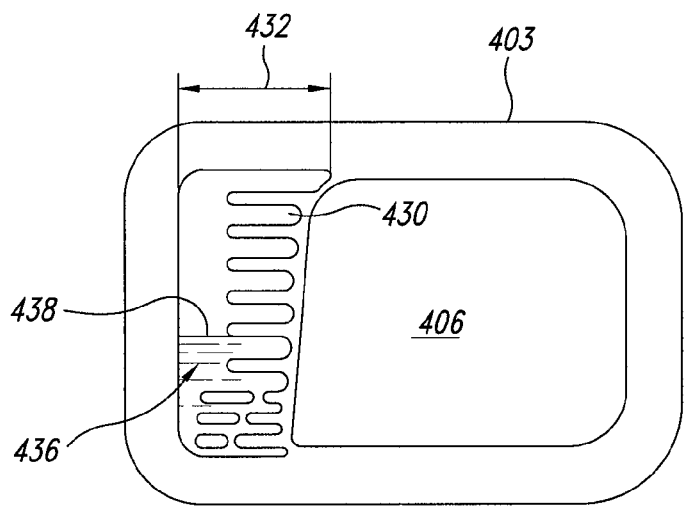
FIG. 9B is a front view of a flow field plate according to still another embodiment of the present invention.
Figure 9C:
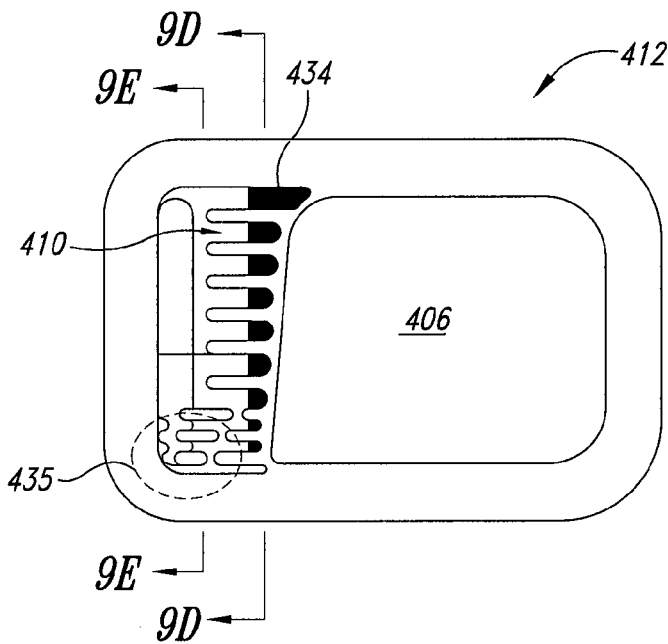
FIG. 9C is a front view of a portion of a flow field plate assembly according to an embodiment of the present invention.

FIGS. 9A-9E illustrate portions of a fuel cell according to yet another embodiment of the present invention in which a flow field plate assembly 412 includes a first flow field plate 402 and a second flow field plate 403. The first flow field plate 402 comprises ribs 428 and a reactant manifold opening 406 as illustrated in FIG. 9A. The second flow field plate 403 comprises a plurality of recesses 430 and a reactant manifold opening 406 as illustrated in FIG. 9B. FIG. 9C illustrates the first and second flow field plates 402, 403 in an assembled state, forming the flow field plate assembly 412. When assembled, the ribs 428 of the first flow field plate 402 at least partially complement the recesses 430 of the second flow field plate 403 to form back-feed channels 410. A height 432 of the recesses 430 can be varied so that a reactant entry opening 434 for each back-feed channel 410 comprises a distinct size. For example, as shown in FIG. 9C, the reactant entry openings 434, identified by the shaded regions, sequentially decrease in size toward one side of the flow field plate assembly 412.

A capillary force increases in the same direction in which the size of the reactant entry openings 434 decrease; therefore, dimensions of the recesses 430 can be predetermined to induce a desirable capillary force and a direction thereof to force liquids such as water to a desired purge region and/or channel(s) 435 from which the liquids can be purged during a purge of the fuel cell stack. Furthermore, at least one of the first and second flow field plates 402, 403 may include other features promoting forcing water and other liquids to the desired purge region and/or channel(s) 435. As one example, the second flow field plate 403 may comprise a sloped surface 436, an edge 438 of which is shown in FIG. 9B, in at least a portion of a surface thereof facing the first flow field plate 402. The slope 436 further induces water and/or other liquids toward the desired purge region and/or channel(s) 435.

It is understood that although a purge region 435 is illustrated in FIG. 9C, the purge region may be in any other location or in more than one location such that the collected liquid, such as water, and/or a condensation or solidification thereof does not interfere with the flow of reactants.

Figure 9D:
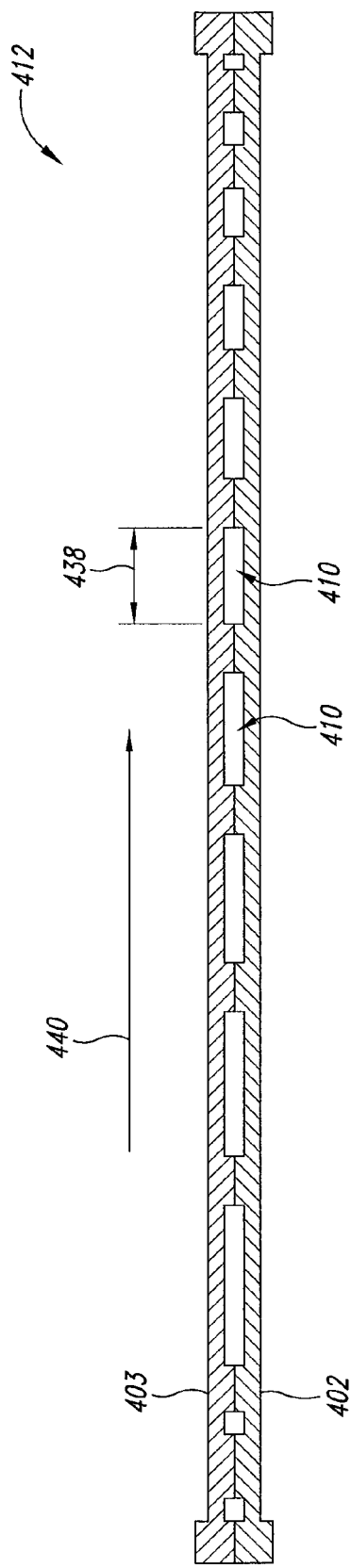
FIG. 9D is a cross-sectional view of a portion of the flow field plate assembly of FIG. 9C, viewed across section 9D-9D.

Additionally, or alternatively, other dimension variations can be implemented across different cross-sections of the back-feed channels 410 to further promote migration of water and other liquids to the desired purge region and/or channel(s) 435. For example, as shown in FIG. 9D, a width 438 of the respective back-feed channels 41 0 can decrease for subsequent back-feed channels 410 in a direction 440, to increase the capillary force in the direction 440 and force water and other liquids to the purge location 435 (FIG. 9C). A proportion of the width 438 of each of the back-feed channels 410 with respect to the other back-feed channels 410 may vary and is not limited by the dimensions, scale or proportions illustrated in FIGS. 9D and 9E. The dimensions, proportions and/or scale of features of the flow field plates 402, 403 illustrated in FIGS. 9D and 9E may be exaggerated or altered for clarity of illustration purposes only. One of ordinary skill in the art having reviewed this disclosure will appreciate these and other modifications that can be made to the geometry of the back-feed channels 410 to force water and/or other liquids toward and/or to the desired purge region and/or channel(s) 435, without deviating from the scope of the present invention.

Figure 9E:
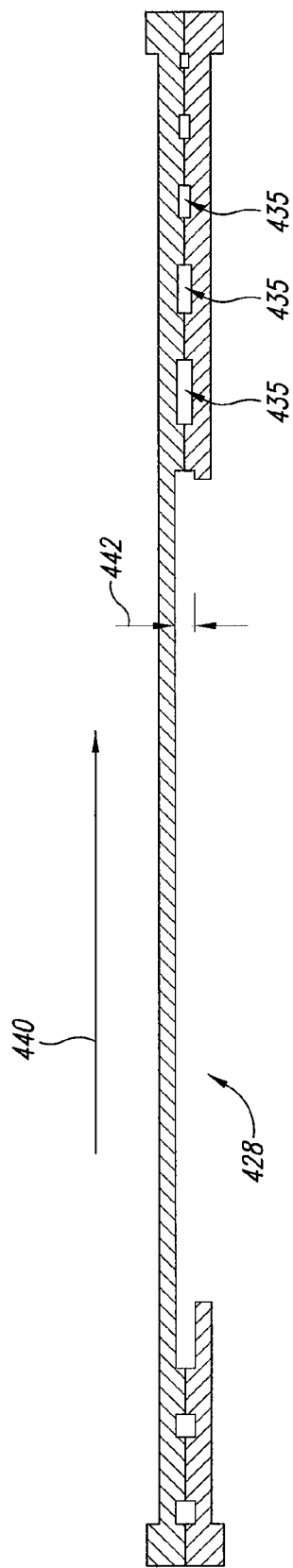
FIG. 9E is a cross-sectional view of another portion of the flow field plate assembly of FIG. 9C1 viewed across section 9E-9E.

For example, additionally, or alternatively, a depth 442 of the back-feed port 428 and/or of purge channels 435 can decrease in the direction 440 to force the water and/or other liquids in the direction 440 via increasing capillary force in substantially a same direction, as illustrated in FIG. 9E. As liquids, such as water, are forced in the direction 440, the back-feed port 428 remains clear of liquids, and therefore of ice formation and/or blockage, such that the flow of reactants to active regions of the fuel cells is uninterrupted and the fuel cell stack operates efficiently without requiring the fuel cell stack to operate under substantially dry conditions.

Figure 10:
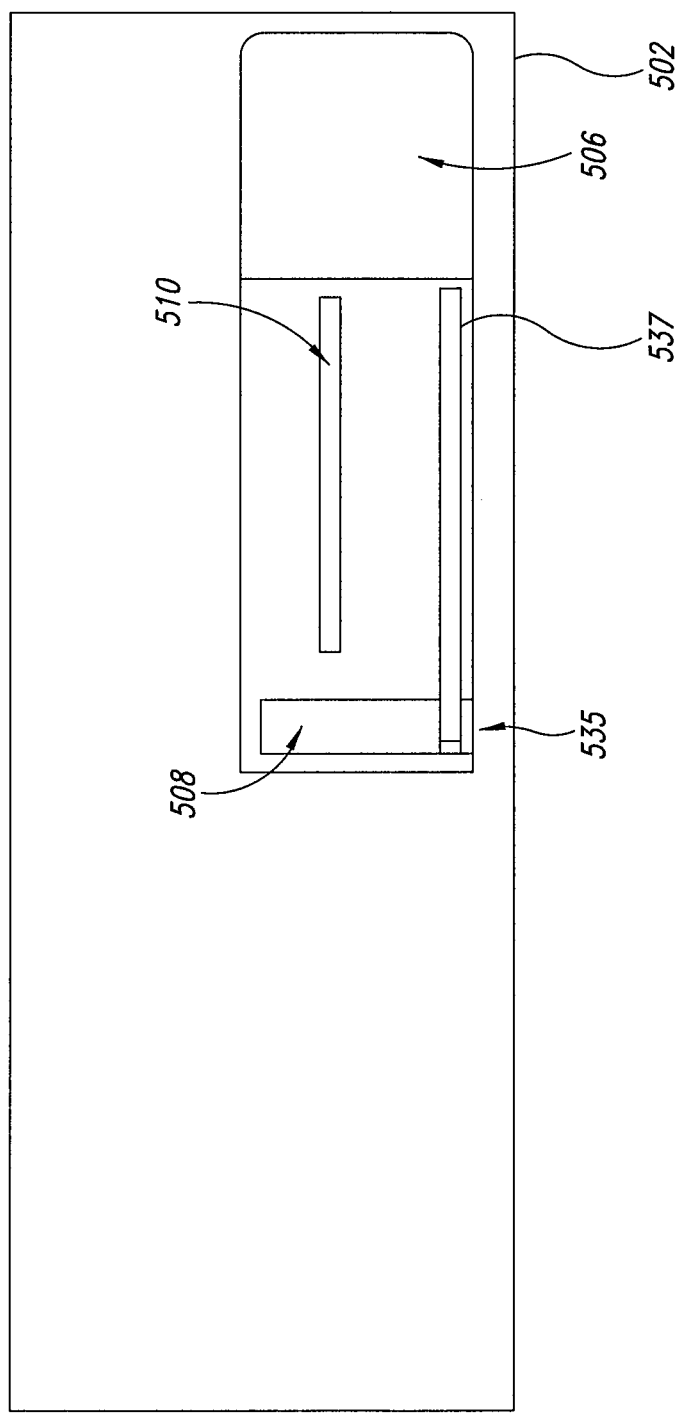
FIG. 10 is a front view of an inactive side of a flow field plate according to another embodiment of the present invention.

As discussed above, the purge region can be in any location and of any form or geometry adapted to purge the migrated liquid. For example, FIG. 10 illustrates an embodiment in which a flow field plate 502 comprises a purge region 535 configured to receive migrated liquid, such as water. The purge region 535 can be in fluid communication with the back-feed port 508 and/or reactant manifold opening 506 via any suitable pathway 537, such as a duct or a channel, formed on at least one flow field plate 502. The pathway 537 may direct the migrated liquid to the reactant manifold opening 506 where the migrated liquid can be entrained by a flow of incoming and/or outgoing reactants to keep the back-feed channels 510 and back-feed port 508 clear of liquid collection and/or ice formation.

Figure 11:
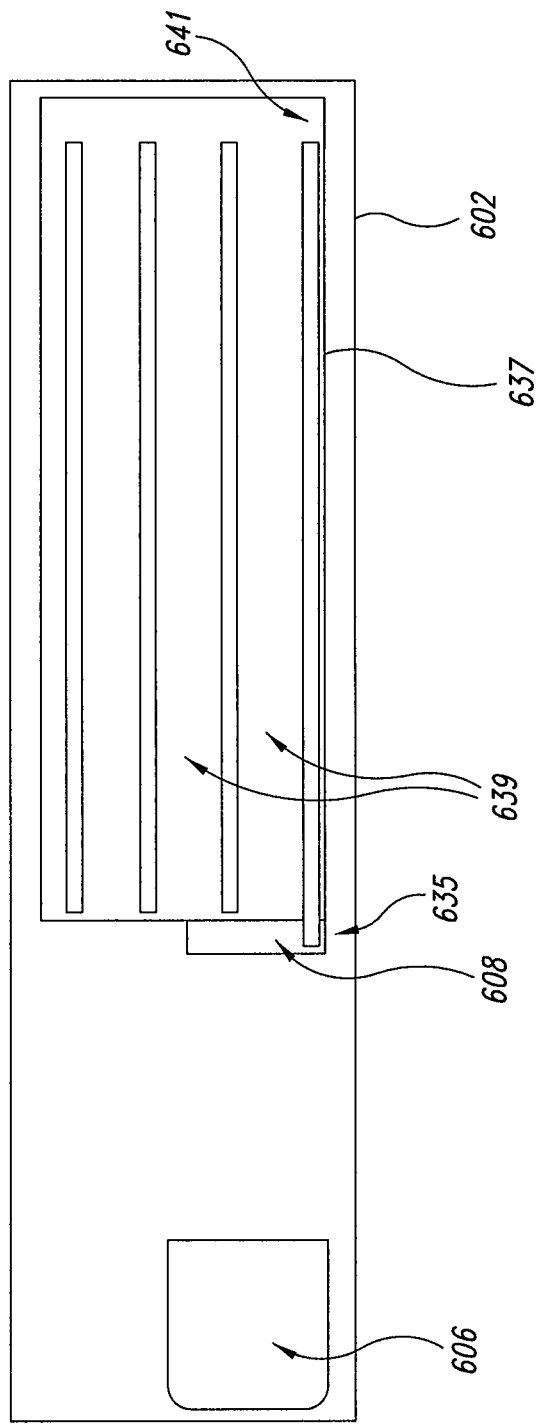
FIG. 11 is a front view of an active side of a flow field plate according to yet another embodiment of the present invention.

Additionally, or alternatively, the purge region and/or pathway that purges the migrated liquid can be formed on and/or be in fluid communication with an active side. For example, FIG. 11 illustrates another embodiment, in which the purge region 635 can be in fluid communication with the back-feed port 608 and/or at least a portion of an active area 639, such as the reactant flow field channels via any suitable pathway 637, such as a duct or a channel, formed on at least one flow field plate 602. The pathway 637 can direct the migrated liquid to the portion of the active area 639, such as a reactant purge region 641, where the migrated liquid can be entrained by a flow of outgoing reactants to keep the active area 639, back-feed port 608, and the back-feed channels on the inactive side of the flow field plate 602 clear of liquid collection and/or ice formation.

Those of ordinary skill in the art having reviewed this disclosure will appreciate that, if desired, geometry variations as discussed herein in conjunction with any of the embodiments can also, or instead, be applied to coolant back-feed channels of the flow field plates 202, 302, 402, 403, 502, 602. Furthermore, geometry variations as discussed herein in conjunction with any of the embodiments can also be applied to flow field plates having coolant and/or reactant feed channels that reside on the same side of the plate on which the coolant and/or reactant flow field channels are formed, such as the inactive and/or active sides of the flow field plate, respectively. Furthermore, these geometric configurations can be achieved by various means.

Figure 12A:
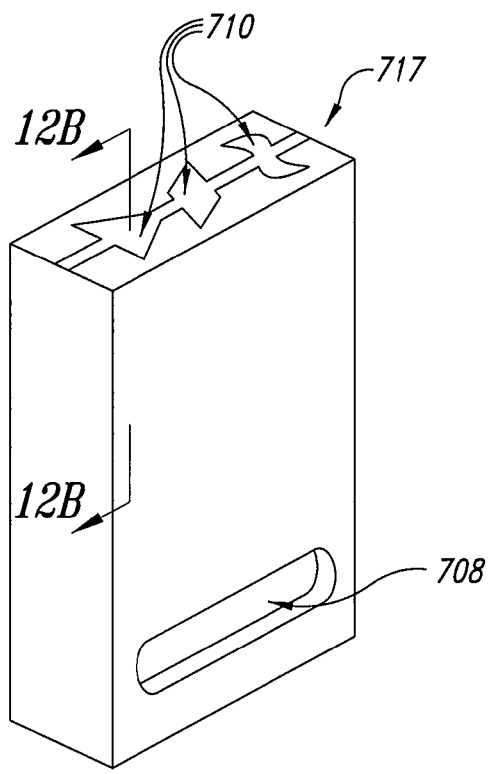
FIG. 12A is an isometric view of an insert forming back-feed channels according to still another embodiment of the present invention.
Figure 12B:
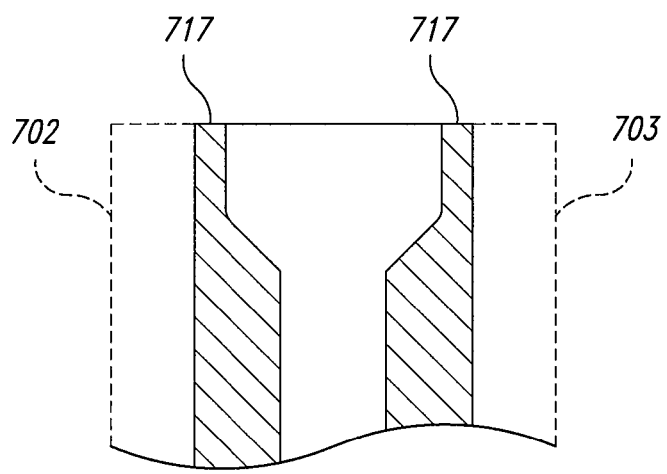
FIG. 12B is a cross-sectional view of a portion of the insert of FIG. 12A, viewed across section 12B-12B.

For example, as shown in FIG. 124 the geometric variations discussed herein can be formed in an insert 717, such as a hydrophobic insert 717, which can retrofit existing flow field plates 702, 703, as shown in FIG. 12B. For example, back-feed channels 710 having geometries that promote liquid migration away from the flow of reactants can be formed in the insert 717. In some embodiments, at least one back-feed port 708, at least partially aligned with a back-feed port of the flow field plates 702, 703, can also be formed in the insert 717. Furthermore, the insert 717 can be manufactured simultaneously with the flow field plates 702, 703, reducing manufacturing time by a duration at least substantially equivalent to that required for machining the flow field plates 702, 703 to form the back-feed channels 710. The hydrophobic insert 717 can be inserted in a portion of at least one of the flow field plate 702, 703, which is machined to receive the hydrophobic insert 717. Additionally, or alternatively, the hydrophobic insert 717 can completely replace a portion of at least one of the flow field plate 702, 703.

Additionally, or alternatively, the geometric variations discussed herein can be machined onto the flow field plates 702, 703 during or after they are manufactured. The geometric variations can be incorporated in the flow field plates 702, 703 by any other suitable method, such as, but not limited to, forming, molding, bonding, or any other method yielding a desired geometry of the flow field plates 702, 703.

Furthermore, the insert 717 may be fabricated from a material, such as silicone, heat resistant plastics, elastics, natural and/or synthetic rubbers, composites, filling material, bonding material, metals, or any other suitable material capable of withstanding typical operational and environmental conditions encountered by a fuel cell stack application.

Furthermore, in some embodiments a hydrophobic coating, such as TEFLON® can be applied to regions where it is desired to impede or substantially terminate water collection and/or ice formation, such as for example, the back-feed channels 210, 310, 410, 510, 710 and/or the back-feed ports 208, 308, 428, 508, 608, 708. Additionally, or alternatively, the flow field plates 202, 302, 402, 403, 502, 602, 702, 703 may be fabricated from material comprising a hydrophobic material, at least in regions of the back-feed channels 210, 310, 410, 510, 710 and/or the back-feed ports 208, 308, 428, 508, 608, 708.

In embodiments where the hydrophobic coating or insert, such as the insert 717 discussed above, is used, the hydrophobic material may comprise sintered PTFE, TEFLON® AF, FLUROPEL®, fluorinated polyurethane, fluorinated epoxies, and/or polyvinylidenefluoride (PVDF). Additionally, or alternatively, the hydrophobic material may be applied as a resin to portions of the flow field plates 202, 302, 402, 403, 502, 602, 702, 703, prone to water accumulation, before incorporating GRAFOIL® material during a manufacturing stage of the flow field plates 202, 302, 402, 403, 502, 602, 702, 703. These portions include areas proximate the reactant manifold openings 206, 306, 406, 506, 606 and proximate to and/or on a surface of the back-feed channels 210, 310, 410, 510, 710.

For example, the hydrophobic coating may be applied proximate to one or both of reactant outlet openings of the flow field plates 202, 302, 402, 403, 502, 602, 702, 703, where water typically accumulates. In some embodiments, the hydrophobic coating may also be applied proximate to one or both of the reactant inlet openings of the flow field plates 202, 302, 402, 403, 502, 602, 702, 703, to maintain symmetry.

Figure 13:
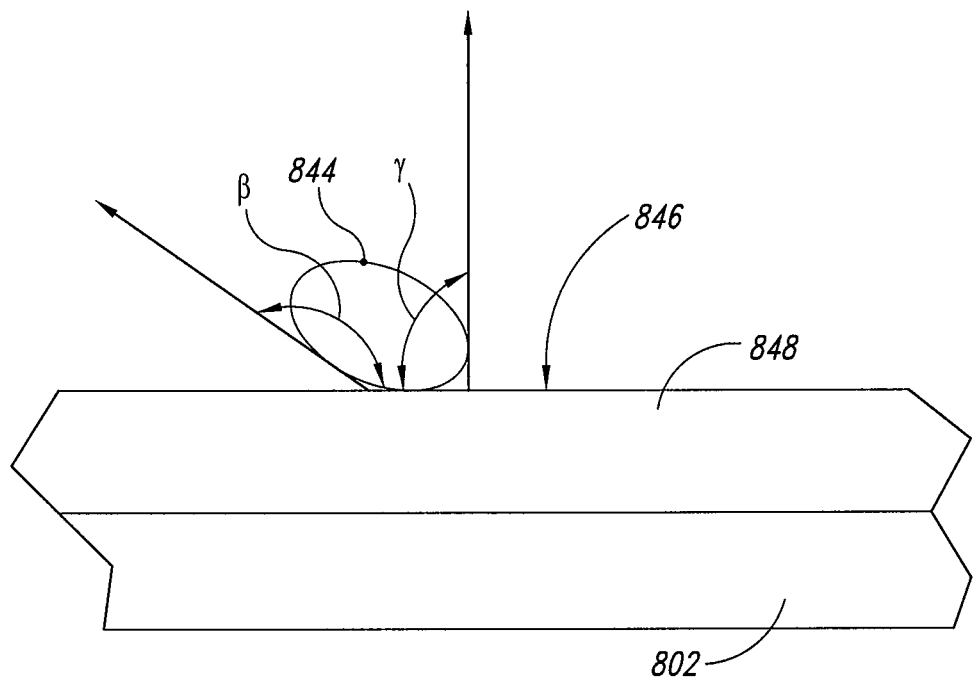
FIG. 13 is a side view of a portion of a flow field plate according to another embodiment of the present invention.

In one embodiment, illustrated in FIG. 13, a surface 848 of a hydrophobic coating and/or material 848, which can be used in regions prone to liquid collection as discussed above, exhibits a first angle $\beta$, representing an advancing contact angle (ACA) and a second angle $\gamma$, representing a receding contact angle (RCA), in response and/or with respect to a specified liquid 844, such as water, or a droplet 844 thereof. These angles determine a hydrophobicity of the surface 846. In one embodiment, the ACA $\beta$ may be greater than 90 degrees, preferably greater than 110 degrees, and the RCA $\gamma$ may be greater than 70 degrees, preferably greater than 90 degrees. These angles are measured by known methods in the art (e.g., the sessile drop method).

Figure 14B:
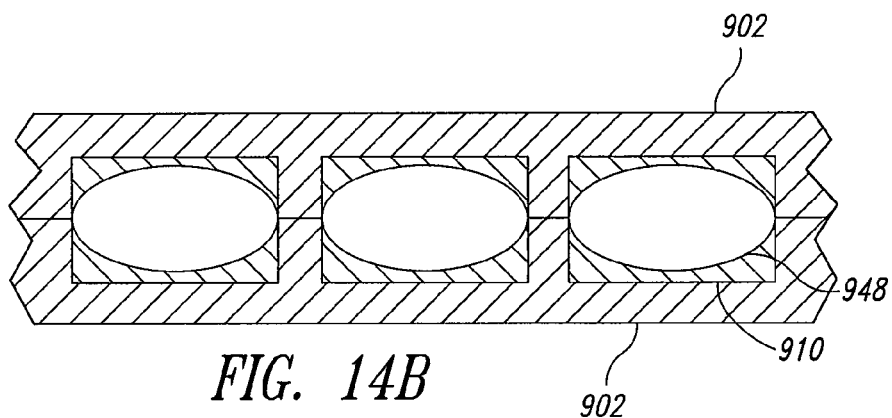
FIG. 14B is a cross-sectional view of a portion of the flow field plate of FIG. 14A, viewed across section 14B-14B.
Figure 14A:
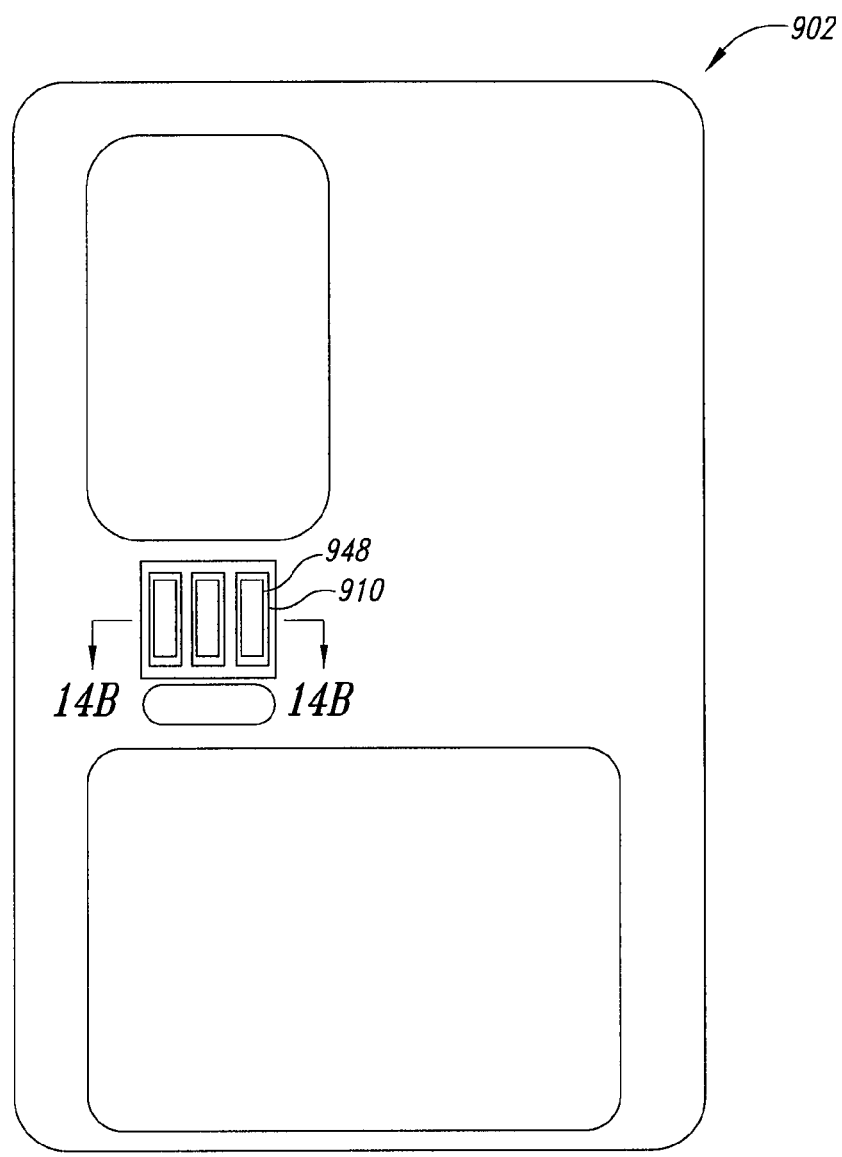
FIG. 14A is a front view of a flow field plate according to yet another embodiment of the present invention.

As illustrated in FIG. 14A, a flow field plate 902 according to another embodiment, may comprise a hydrophobic coating and/or material 948 filling at least one corner of at least one back-feed channel 910 and preventing water from accumulating proximate to or in the back-feed channels 910. Only one flow field plate 902 is shown in FIG. 14A for clarity of illustration. FIG. 14B illustrates a cross-section of the back-feed channels 910 formed by an assembly of two flow field plates 902 and having the hydrophobic coating and/or material 948. As shown in FIG. 14B, the hydrophobic coating and/or material 948 may also fill more than one corner of the back-feed channels 910, such that the hydrophobic coating and/or material crosses a region where the flow field plates 902 mate or bond to form a flow field plate assembly. In such embodiments, the hydrophobic coating and/or material may also serve to strengthen a joint between two flow field plates 902, which form the flow field plate assembly.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and equivalents thereof.

The invention claimed is:

1. A flow field plate assembly for a fuel cell stack having a plurality of fuel cells, each comprising a membrane electrode assembly (MEA), the flow field plate assembly comprising:

a first flow field plate having first and second reactant manifold openings and being positionable on an anode side of the MEA of a first fuel cell, a first side of the first flow field plate having at least one reactant flow field channel adapted to direct a fuel to an anode electrode layer of the MEA; and a second flow field plate having third and fourth reactant manifold openings and being positionable on a cathode side of the MEA of a second fuel cell, adjacent the first fuel cell, a first side of the second flow field plate having at least one reactant flow field channel adapted to direct an oxygen-containing gas to a cathode electrode layer of the MEA; wherein, the third reactant manifold opening is positioned adjacent the first reactant manifold opening, forming a fuel manifold opening;

the fourth reactant manifold opening is positioned adjacent the second reactant manifold opening, forming an oxidant manifold opening;

at least one of the fuel and oxidant manifold openings has a cross-sectional geometry that is configured to have a region for flow of reactants and a region substantially isolated from flow of reactants, wherein said region substantially isolated from flow of reactants tapers to provide a region which draws water by capillary force such that when the flow field plate assembly is installed in the fuel cell stack and the fuel cell stack is in operation, capillary forces direct liquid migration toward said regions substantially isolated from a flow of reactants;

the flow field plate assembly further comprises at least one back-feed channel formed between the first and second flow field plates in fluid communication with at least one of the fuel and oxidant manifold openings and at least one of the reactant flow field channels;

the back-feed channel has a region for flow of reactants and a region substantially isolated from flow of reactants, wherein said region substantially isolated from flow of reactants has at least one of a cross-sectional geometry and a longitudinal geometry configured to taper to create high and low capillary forces that direct liquid migration toward said regions substantially isolated from a flow of reactants, when the flow field plate assembly is installed in the fuel cell stack and the fuel cell stack is in operation; and at least a portion of the back-feed channel is fabricated from a hydrophobic material exhibiting an advancing contact angle of at least 90 degrees and a receding contact angle of at least 70 degrees in response to contact with water.

2. The flow field plate assembly of claim 1, wherein:

the cross-sectional geometry of the portion of the periphery of the at least one of the fuel and oxidant manifold openings comprises a slot formed by the first and second flow field plates proximate the reactant manifold openings thereof;

the slot has a wider end open to the at least one of the fuel and oxidant manifold openings, and a narrower end spaced from the wider end in a direction away from the periphery;

the wider end has a dimension that prevents a liquid from wicking along the periphery of the at least one of the fuel and oxidant manifold openings, and exhibits reduced capillary forces to promote liquid migration toward at least a portion of the at least one of the fuel and oxidant manifold openings from which the liquid is entrained by a flow of at least one fluid exiting the fuel cell stack, when the flow field plate assembly is installed in the fuel cell stack and the fuel cell stack is in operation or during a purge of the fuel cell stack after operation;

the slot further comprises a transition region between the wider and narrower ends; and the transition region comprises portions of the first and second flow field plates forming a substantially rectangular cross-sectional shape;

a longitudinal cross section of the flow field plate assembly is oriented such that when the flow field plate assembly is installed in the fuel cell stack and the fuel cell stack is in operation or during a purge of the fuel cell stack after operation, the reduced capillary forces and a force of gravity promote liquid migration to a bottom portion of the at least one of the fuel and oxidant manifold openings, from which portion the liquid is entrained by the flow of the at least one fluid exiting the fuel cell stack.

3. The flow field plate assembly of claim 1 wherein the material exhibits an advancing contact angle of greater than 110 degrees and a receding contact angle of greater than 90 degrees in response to contact with water.

4. The flow field plate assembly of claim 1, wherein at least a portion of at least one of the periphery of the fuel and oxidant manifold openings comprises a hydrophobic coating exhibiting an advancing contact angle of at least 90 degrees and a receding contact angle of at least 70 degrees in response to contact with water.

5. The flow field plate assembly of claim 1, wherein:
the flow field plate assembly further comprises an insert forming the at least one back-feed channel;
a cross-sectional geometry of a portion of the insert positioned between the back-feed channel and the at least one of the fuel and oxidant manifold openings comprises a slot having a wider end adjacent the at least one of the fuel and oxidant manifold openings and a narrower end spaced from the wider end away from the at least one of the fuel and oxidant manifold openings;
the wider end has a dimension that is larger than a dimension of the narrower end, and is adapted to prevent the liquid from wicking toward the at least one back-feed channel and exhibiting reduced capillary forces to promote liquid migration toward the at least one of the fuel and oxidant manifold openings from which the liquid is entrained by a flow of reactants exiting the fuel cell stack, when the flow field plate assembly is installed in the fuel cell stack and the fuel cell stack is in operation or during a purge of the fuel cell stack after operation.

6. The flow field plate assembly of claim 5 wherein the insert comprises at least one of a hydrophobic material and a hydrophobic coating exhibiting an advancing contact angle of at least 90 degrees and a receding contact angle of at least 70 degrees in response to contact with water.

7. The flow field plate assembly of claim 5 wherein the insert replaces at least a portion of the flow field plate assembly comprising the back-feed channel.

8. The flow field plate assembly of claim 5 wherein the insert nests in at least a portion of the flow field plate assembly forming the back-feed channel.

9. The flow field plate assembly of claim 1, wherein:
the flow field plate assembly further comprises at least one of a hydrophobic material and a hydrophobic coating exhibiting an advancing contact angle of at least 90 degrees and a receding contact angle of at least 70 degrees in response to contact with water; and
the at least one of the hydrophobic material and a hydrophobic coating fills at least one corner of each back-feed channel.

10. The flow field plate assembly of claim 1, wherein:
the flow field plate assembly comprises a plurality of back-feed channels formed between the first and second flow field plates in fluid communication with at least one of the fuel and oxidant manifold openings and at least one of the reactant flow field channels; and
at least one back-feed channel includes at least one surface that tapers along a length of the back-feed channel forming an opening at a first end of the back-feed channel wider than an opening at an opposing second end of the back-feed channel.

11. The flow field plate assembly of claim 2, wherein:
the slot further comprises a transition region between the wider and narrower ends; and
the transition region comprises a first portion in which the first and second flow field plates are substantially parallel and at least a second portion in which the first and second flow field plates form a substantially tapered cross-sectional shape.

12. The flow field plate assembly of claim 1, wherein:
the first flow field plate comprises a plurality of ribs;
the second flow field plate comprises a plurality of recesses;
the ribs and recesses form a plurality of back-feed channels;
each back-feed channel comprising a reactant entry opening proximate an end of the back-feed channel open to at least one of the fuel and oxidant manifold openings; and
the respective reactant entry openings having at least one of a distinct size and a distinct shape.

13. The flow field plate assembly of claim 12, wherein:
the flow field plate assembly further comprises a liquid purge region; and
the size of the reactant entry openings of the back-feed channels sequentially decreases in a first direction, away from the flow of the reactants and toward the liquid purge region, creating a gradient of increasing capillary forces in the first direction to induce a flow of liquids in the first direction toward the liquid purge region where the liquid can be purged, when the flow field plate assembly is installed in the fuel cell stack and the fuel cell stack is in operation or during a purge of the fuel cell stack after operation.

14. The flow field plate assembly of claim 12, wherein:
the flow field plate assembly further comprises a liquid purge region; and
a width of the taper region of the back-feed channels sequentially decreases in a first direction, away from the flow of the reactants and toward the liquid purge region, creating a gradient of increasing capillary forces in the first direction to induce a flow of liquids in the first direction toward the liquid purge region where the liquid can be purged, when the flow field plate assembly is installed in the fuel cell stack and the fuel cell stack is in operation or during a purge of the fuel cell stack after operation.

* * * * *